United States Patent
Baluja

(10) Patent No.: US 8,176,414 B1
(45) Date of Patent: May 8, 2012

(54) DOCUMENT DIVISION METHOD AND SYSTEM

(75) Inventor: Shumeet Baluja, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1068 days.

(21) Appl. No.: 11/241,224

(22) Filed: Sep. 30, 2005

(51) Int. Cl.
*G06F 17/00* (2006.01)

(52) U.S. Cl. ......... 715/238; 715/234; 715/252; 715/273

(58) Field of Classification Search .......... 715/273–277, 715/238, 252
See application file for complete search history.

(56) References Cited

U.S. PATENT DOCUMENTS

| | | | | |
|---|---|---|---|---|
| 5,754,832 A * | 5/1998 | Sasaki | | 715/255 |
| 5,901,245 A * | 5/1999 | Warnick et al. | | 382/190 |
| 6,031,939 A * | 2/2000 | Gilbert et al. | | 382/239 |
| 6,064,762 A | 5/2000 | Haenel | | 382/171 |
| 6,230,174 B1 * | 5/2001 | Berger et al. | | 715/201 |
| 6,278,464 B1 | 8/2001 | Kohavi et al. | | 345/440 |
| 6,397,205 B1 | 5/2002 | Juola | | 707/2 |
| 6,424,828 B1 | 7/2002 | Collins et al. | | 455/412 |
| 6,633,303 B2 * | 10/2003 | Nakajima | | 345/629 |
| 6,683,983 B1 * | 1/2004 | Shen et al. | | 382/168 |
| 6,684,087 B1 | 1/2004 | Yu et al. | | 455/566 |
| 6,728,399 B1 * | 4/2004 | Doll | | 382/164 |
| 6,775,392 B1 | 8/2004 | Rhoads | | 382/100 |
| 6,775,405 B1 * | 8/2004 | Zhu | | 382/154 |
| 6,792,151 B1 * | 9/2004 | Barnes et al. | | 382/239 |
| 6,801,657 B1 | 10/2004 | Cieplinski | | 382/164 |
| 6,873,343 B2 | 3/2005 | Chui | | 345/667 |
| 6,904,176 B1 | 6/2005 | Chui et al. | | 382/240 |
| 6,956,569 B1 * | 10/2005 | Roy et al. | | 345/426 |
| 7,019,761 B2 * | 3/2006 | Srinidhi et al. | | 345/643 |
| 7,035,439 B2 * | 4/2006 | Harrington et al. | | 382/112 |
| 7,040,821 B2 * | 5/2006 | Yamanaka | | 400/76 |
| 7,085,999 B2 * | 8/2006 | Maeda et al. | | 715/236 |
| 7,095,512 B1 * | 8/2006 | Yoda et al. | | 358/1.13 |
| 7,162,081 B2 * | 1/2007 | Timor et al. | | 382/168 |
| 7,171,618 B2 * | 1/2007 | Harrington et al. | | 715/229 |
| 7,177,488 B2 * | 2/2007 | Berkner et al. | | 382/298 |
| 7,187,800 B2 * | 3/2007 | Hibbard | | 382/173 |
| 7,236,637 B2 * | 6/2007 | Sirohey et al. | | 382/240 |
| 7,272,258 B2 * | 9/2007 | Berkner et al. | | 382/176 |
| 7,350,142 B2 * | 3/2008 | Kraft et al. | | 715/210 |

(Continued)

OTHER PUBLICATIONS

XVel Software product description of "Image Cut", downloaded from http://xxx.xvel.com?a=show&i=imagecutsplitter&1=en, on Sep. 23, 2005 (3 pages).

(Continued)

*Primary Examiner* — Doug Hutton, Jr.
*Assistant Examiner* — Benjamin Smith
(74) *Attorney, Agent, or Firm* — Fish & Richardson P.C.

(57) ABSTRACT

A method for formatting an electronic document for display on an electronic device includes receiving a first electronic document, determining a first entropy value associated with a first line that divides the first electronic document into two portions, determining a second entropy value associated with a second line that divides the first electronic document into two portions, and generating a second electronic document that includes at least a portion defined by the line having the lower entropy value. The first and second entropy values may comprise summing portion entropy values associated with the portions defined by the first line to obtain the first entropy value and summing portion entropy values associated with the portions defined by the second line to obtain the second entropy value.

11 Claims, 11 Drawing Sheets

U.S. PATENT DOCUMENTS

| | | | |
|---|---|---|---|
| 7,392,473 B2 * | 6/2008 | Meunier | 715/247 |
| 7,428,700 B2 * | 9/2008 | Wen et al. | 715/239 |
| 7,613,810 B2 * | 11/2009 | Romero et al. | 709/227 |
| 7,639,387 B2 * | 12/2009 | Hull et al. | 358/1.18 |
| 7,669,148 B2 * | 2/2010 | Hull et al. | 715/864 |
| 7,861,165 B2 * | 12/2010 | Stevenson | 715/273 |
| 7,873,901 B2 * | 1/2011 | Chen et al. | 715/234 |
| 2002/0059367 A1 * | 5/2002 | Romero et al. | 709/203 |
| 2003/0011631 A1 * | 1/2003 | Halahmi | 345/744 |
| 2003/0053686 A1 * | 3/2003 | Luo et al. | 382/165 |
| 2004/0031058 A1 * | 2/2004 | Reisman | 725/112 |
| 2004/0034836 A1 * | 2/2004 | Ikeno | 715/530 |
| 2004/0054669 A1 * | 3/2004 | Seyrat et al. | 707/3 |
| 2004/0268233 A1 * | 12/2004 | Okumura et al. | 715/513 |
| 2005/0058486 A1 * | 3/2005 | Yamanaka | 400/76 |
| 2005/0066269 A1 * | 3/2005 | Wang et al. | 715/513 |
| 2005/0071755 A1 * | 3/2005 | Harrington et al. | 715/511 |
| 2005/0102628 A1 * | 5/2005 | Salesin et al. | 715/764 |
| 2005/0196037 A1 * | 9/2005 | Muenzenmayer et al. | 382/159 |
| 2005/0210371 A1 * | 9/2005 | Pollock et al. | 715/509 |
| 2005/0229111 A1 * | 10/2005 | Makela | 715/802 |
| 2006/0136491 A1 * | 6/2006 | Berkner et al. | 707/103 R |
| 2006/0149726 A1 * | 7/2006 | Ziegert et al. | 707/5 |
| 2006/0149775 A1 * | 7/2006 | Egnor | 707/102 |
| 2006/0212802 A1 * | 9/2006 | Wakeam et al. | 715/513 |
| 2007/0061384 A1 * | 3/2007 | Harrington et al. | 707/203 |
| 2007/0083810 A1 * | 4/2007 | Scott et al. | 715/525 |
| 2007/0110301 A1 * | 5/2007 | Wu et al. | 382/162 |
| 2008/0092040 A1 * | 4/2008 | Nakamura | 715/273 |

OTHER PUBLICATIONS

XVel "Image Cut" Help Page downloaded from http://www.xvel.com/descriptions/imagecutsplitter/en, on Sep. 23, 2005 (5 pages).

* cited by examiner

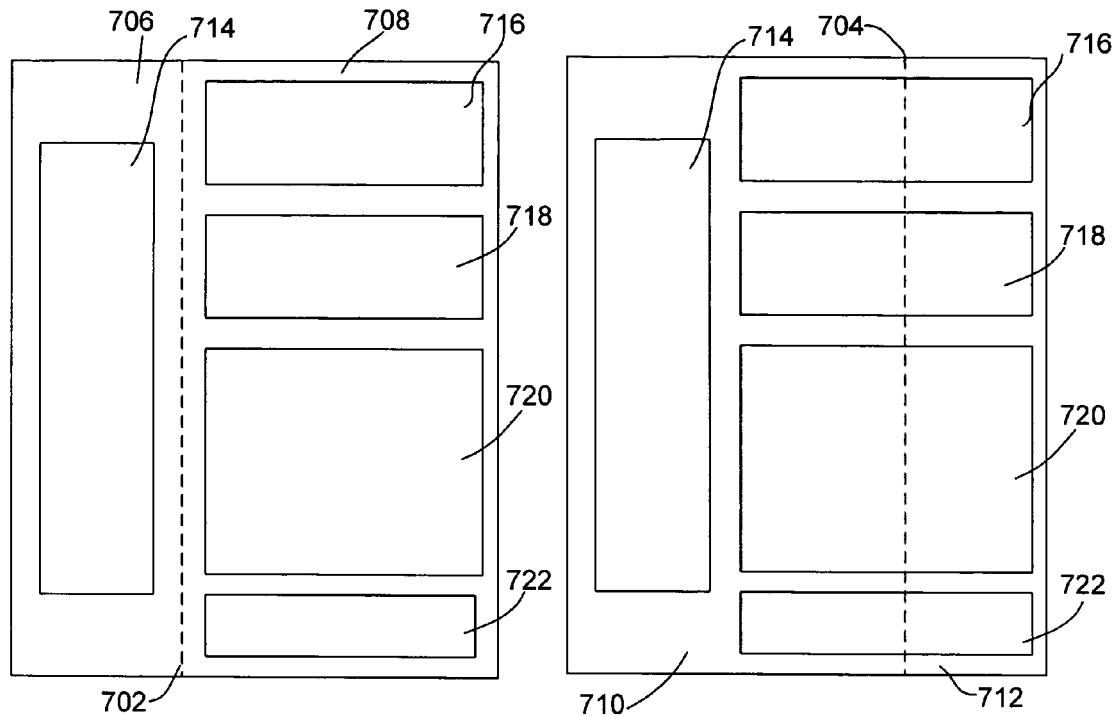
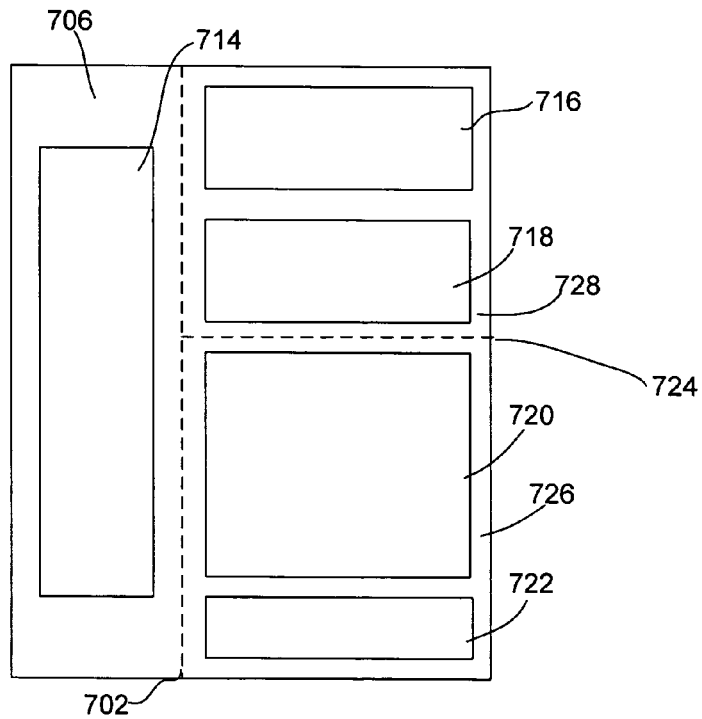
FIG. 7a
FIG. 7b
FIG. 7c

DOCUMENT DIVISION METHOD AND SYSTEM

TECHNICAL FIELD

This application relates to a document division method and system.

BACKGROUND

As computers and computer networks become more and more able to access a variety of information, people are demanding more ways to obtain that information. Specifically, people now expect to have access, on the road, in the home, or in the office, to information previously available only from a permanently-connected personal computer hooked to an appropriately provisioned network. They want the latest news from their cell phones, e-mail from their personal digital assistants (PDAs), and up-to-date documents from their palm tops. They also want all of this information when traveling, whether locally, domestically, or internationally, in an easy-to-use, portable device.

Portability generally requires a device small in size, which in turn limits the screen area available for displaying content. This limitation may require the portable device to reduce text and images within documents to an illegible or unrecognizable state when displayed on a small screen. Alternatively, a document may be displayed at a larger size, but a user must scroll to see some parts of the document.

Current systems may magnify an area of the document with a software magnifier. For example, a user may drag a magnifying glass cursor over a section of a word processing document the user wants to see in greater detail. The area around the magnifying icon is enlarged. Enlarging the document with a magnifier, however, requires the user to manipulate the magnifying icon, which may be difficult on portable devices with small screens and input devices. Additionally, the magnifying software is installed on the device that is enlarging the document. Portable devices are often constrained by memory and processing capabilities, which may make the storage and execution of the magnifying software on the portable device undesirable.

DESCRIPTION OF DRAWINGS

FIGS. 7A-7C are schematic diagrams showing a division of the electronic document based on the DOM elements according to one implementation.

Like reference symbols in the various drawings indicate like elements.

SUMMARY

Figure 1:
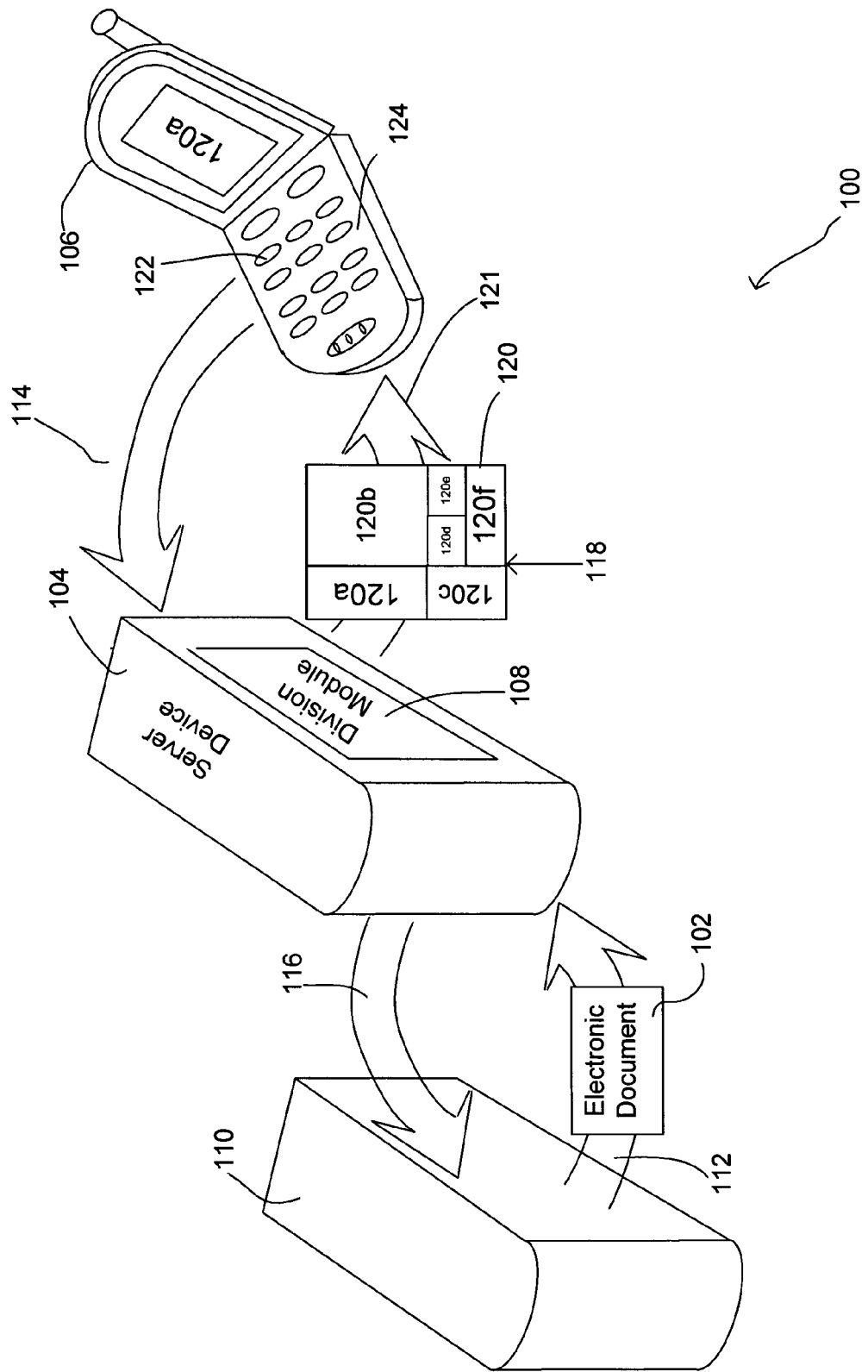
FIG. 1 is a schematic diagram of a system that divides an electronic document based on information gain according to one implementation.

This document discloses methods and systems for dividing an electronic document.

In accordance with one aspect, a method for formatting an electronic document for display on an electronic device is disclosed. The method includes receiving a first electronic document, determining a first informational gain value associated with a first line that divides the first electronic document into two portions, determining a second informational gain value associated with a second line that divides the first electronic document into two portions, and generating a second electronic document that includes at least a portion defined by the line having the greater informational gain value.

Determining the first and second informational gain values may comprise subtracting an entropy value associated with the first line from an entropy value associated with the first electronic document to obtain the first information gain value, and subtracting an entropy value associated with the second line from the entropy value associated with the first electronic document to obtain the second information gain value. The entropy values associated with the lines and the first electronic document may be determined with an entropy calculation comprising determining a number and area of document objects in portions created by the lines or in the first electronic document, respectively.

In one example, the document objects may be specified by hypertext markup language elements. The method may also include parsing the document objects into a document object model tree. Additionally, the method may favor the selection of lines that intersect the document objects located closer to a root of the document object model tree, and the depth of a document object may calculated for each pixel intersected by the lines.

In another example, the information gain values may be weighted by an entropy value based on the variation between intensities of pixels that the first line intersects to obtain the information gain value to weight the information gain value associated with first line and an entropy value based on the variation between intensities of pixels that the second line intersects to obtain the information gain value to weight the information gain value associated with second line. An information gain calculation may be used to recursively divide the portions defined by the line having the greater information gain.

The recursive division may be stopped when a maximum number of lines are selected. The recursive division may be stopped when an information gain threshold is not met. The information gain calculation may further include coefficients weighted to favor the divisions that produce similarly sized rectangles. The information gain calculation may further include coefficients weighted to favor the divisions that create portions larger than a minimum height and width.

The electronic document may include an image. Also, the electronic document may include a web page. The portions defined by the first line and may overlap the portions defined by the second line, and the first and second lines may be straight. Also, the first and second lines may be horizontal or vertical, and the first and second lines may be continuous.

In accordance with another aspect, a system for segmenting an electronic document is disclosed. The system includes means for dividing a first electronic document into portions based on an information gain calculation, a document generator to generate a second electronic document that includes at least one of the portions created by the divisions, and an interface for transmitting the second electronic document to a remote device.

In accordance with yet another aspect, a method for processing an electronic document for viewing on an electronic device is disclosed. The method includes receiving a first electronic document, dividing the first electronic document into portions, determining an information gain value based on the divisions, selecting the divisions that produce the highest information gain values, and generating a second electronic document comprising the portions created by the selected divisions. The portions may be selectable for enlarged viewing.

In one example, determining the entropy value may include determining a number and area of document objects in the portions created by the divisions and determining a variation of pixel intensities intersected by lines that create the divisions. Also, selecting the divisions may include selecting a set of candidate divisions based on the number and area of the document objects in the portions created by the candidate divisions and selecting a final division from the set of candidate divisions based on the variation of pixel intensities intersected by the candidate divisions. Additionally, selecting the divisions may include selecting a candidate division based on the number and area of the document objects in the portions created by the candidate division, determining the variation of pixel intensities intersected by one or more proximate lines a predetermined distance from the candidate division, and selecting the candidate division or proximate line with the least variation.

In accordance with another aspect, a computer implemented method for viewing segmented electronic documents is disclosed. The method includes receiving at an electronic device a processed electronic document generated by dividing an initial electronic document into portions based on which divisions produced the highest entropy values. The electronic device may be selected from a group consisting of a mobile telephone, a personal digital assistant, a portable computer, and a mobile e-mail device.

DETAILED DESCRIPTION

FIG. 1 is a schematic diagram of a system 100 that divides an electronic document 102 based on information gain values according to one implementation. The system 100 may include a server device 104 and an electronic device, such as a remote device 106. The server device 104 includes a division module 108 that divides the electronic document 102 based on information gain values, which are discussed in greater detail below. The server device 104 may receive the electronic document 102 from an external web server 110, as indicated by arrow 112. Alternatively, the electronic document 102 may be stored at the server device 104 and transmitted to the division module 108 for processing.

In the implementation shown in FIG. 1, the remote device 106 may request from the server device 104 an electronic document 102, such as a web page. This request is shown by arrow 114. The server device 104 requests the web page 102 from the external web server 110, as indicated by arrow 116. Next, the external web server 110 responds to the request by transmitting the web page 102 to the server device 104, as shown by the arrow 112.

When the server device 104 receives the web page 102, it transmits it to the division module 108. The division module divides the page 102 with lines. Each of the lines has an associated information gain value. The division module compares information gain values for each of the lines. The lines that produced the highest information gain values are selected to divide the document. After the document has been divided once, this process may be repeated recursively for the portions created by the first division. For example, the division module 102 may first divide the document with a vertical line through the left portion of the document 102, as shown by a line 118 in the divided document 120. The module 102 may then divide the document a second time by another line (not shown). The division module 102 then calculates information gain values associated with both lines. Here, the line 118 produces the highest information gain value, so the division module selects it to define a division. This process is repeated with lines until the document 120 is divided into smaller portions 120A-F.

The divided document 120, such as an e-mail message, an image, a word processing document, or a web page, is transmitted to the remote device 106 for display, as indicated by arrow 121. If the remote device 106 is a cellular telephone, the smaller portions 120A-F may be displayed simultaneously in positions that resemble the original electronic document 102. The remote device 106 may display each of the portions 120A-F so that the dividing lines defining the portions are visible. The user may use the keys on a cell phone to select a portion 120A to view in more detail. For example, the user may press a (1) key 122 on a keypad 124. The portion 120A is highlighted, and when the user presses the (1) key 122 again, the portion 120A enlarges to display the portion using the full screen of the cellular telephone 106.

In another implementation, the division module 108 may be implemented at the remote device 106. This may permit the remote device 106 to access content directly from external web servers, such as the web server 110, without first passing the electronic document 102 through the server device 104. The remote device may divide the electronic document 102 based on information gain values and display portions of the divided document to the user. Information gain value of a particular line is a measure of how much information may be obtained by splitting the document into portions compared to the information gained from not splitting the document. To do this, the information gain calculation compares weighted entropy of portions created by the line that splits the document with the entropy of the undivided document. More formally, the information gain calculation may be expressed as InfoGain (Y|Split)=Entropy (Y)−Entropy (Y|Split), where the InfoGain (Y|Split) is the information gain value associated with the particular line, the Entropy (Y) is the entropy of the first electronic document, and the Entropy (Y|Split) is the weighted entropy associated with the portions created by the particular line.

Entropy may be defined as $$H(X) = -p_1 \log_2 p_1 - p_2 \log_2 p_2 - \ldots - p_m \log_2 p_m = -\sum_{j=1}^{m} p_j \log_2 p_j$$

where H(X) is entropy and $p_{1, 2 \ldots n}$ is a fractional value, where the area of an object, such as an HTML element, included within a portion (for which the entropy is calculated) is the numerator. The denominator is the area of the portion. Note that the entropy values mentioned throughout this application may be scaled entropy values.

To calculate the entropy of the document (i.e., Entropy (Y)), the area of each object contained in the entire document (which is the "portion" in this case) is divided by the area of the entire document. For example, the document may be a web page with an area of 10. The web page may contain two objects, such as two images, each with an area of 1. The entropy calculation for the entire document would be $$H(Doc)=\text{Entropy }(Y)=-1/10\log_2 1/10 - 1/10 \log_2 1/10.$$

Entropy (Y|Split) is a weighted entropy that may be expressed as $$\text{Entropy }(Y(\text{Split})=\text{Total\_Area (Region\_1)*Entropy (Region\_1)}+\text{Total\_Area (Region\_2)*Entropy (Region\_2)}$$

where the Total_Area (Region_1) and the Total_Area (Region_2) are the areas of each of the regions, or portions, created by a line dividing the first electronic document, and the Entropy (Region_1) and Entropy (Region_2) are the entropy of these portions, respectively.

To calculate the entropy of a first portion created by a line (i.e., Entropy (Region_1)), the area of an object within (or partially within) the first portion is the numerator of the $p_n$ in the entropy equation, and the total area of the first portion is the denominator. For example, a web page may be divided into two halves, A and B. Halves A and B may each have a size of 20, therefore the total size of the web page is 40. A paragraph of text is an object in the web page, and ⅓ of the paragraph is in half A and ⅔ of the paragraph is in half B. The total area of the paragraph is "5." Using the entropy equation above, the entropy for half A is $$H(A)=-((1/3)*5)/20*\log_2((1/3)*5)/20,$$

and the entropy for half B is $$H(B)=-((2/3)*5)/20*\log_2((1/3)*5/20.$$

So given the entropy of each half (i.e., H(A) and H(B), the entropy created by the split (Entropy (Y|Split)) may be calculated using the fact that each portion is size 20.

$$\text{Entropy }(Y|\text{Split})=\text{Total\_Area (Region\_1)*Entropy (Region\_1)}+\text{Total\_Area(Region\_2)*Entropy (Region\_2)}$$

is $$\text{Entropy}(Y|\text{Split})=20*-[((1/3)*5)/20*\log_2((1/3)*5)/20]+20*-[((2/3)*5)/20*\log_2((1/3)*5)/20]$$

for the given example.

The information gain may be calculated using the entropy calculations discussed above. For example, two regions A and B are induced by a cut line L. Region A is of size 10 and Region B is of size 20. Therefore, the total size of the undivided document is thirty (10+20=30). The document is a web page that contains three HTML elements, or document object model (DOM) elements, where the first element X is of size 6, the second element Y is of size 7, and the third element Z is of size 8. X is completely in Region A, Y is ⅓ in Region A and ⅔ in Region B, and Z is completely in region B. Thus, the entropy of Region A is $$\text{Entropy}_{RegionA}=-[6/10*\log 6/10+((1/3)*7)/10*\log(((1/3)*7)/10)]$$

and the entropy of Region B is $$\text{Entropy RegionB}=[((2/3)*7)/20*\log(((2/3)*7)/20)+8/20*\log 8/20]$$

Using these values, the information gain of this division is $$\text{InformationGain}_{LineL}=(6/30*\log(6/30)+7/30*\log(7/30)+8/30*\log(8/30))-(10/30*\text{Entropy}_{RegionA}+20/30*\text{Entropy}_{RegionB})$$

Multiplying the information for each portion by the total area of the portion weights the entropy calculation by the size of the portion created. In this way, very small portions with low entropies will not factor into the information gain equation as significantly as very large portions with low entropies. This may mean that lines which create large portions with low entropies are favored over lines that create small portions with low entropies.

An abbreviated form of entropy is described in the examples above. Although not addressed in the previous examples, two DOM elements may be required for entropy to occur. If there is only one element, then entropy is zero (i.e., there is no uncertainty). In the case where there is only a single DOM element, the system may define it as either 1) being in a DOM element (class 1) or 2) not being in a DOM element (class 2), such as the <body> tag is not within another element. The examples address class 1 cases, but the entropy calculation for the cases is similar. In some implementations, the entropy calculations described in "Elements of Information Theory" by Thomas M. Cover and Joy A. Thomas and published Aug. 12, 1991 by Wiley-Interscience, which is entirely incorporated herewithin, may be used.

So, using the equations above, information gain may be determined based on each division created by a line. In one example, the information gain may be illustrated as follows: a point on a web page may be randomly selected, and the system is tasked with determining in which DOM element the point is located. In the base case, the system is not given any information. However, the system may obtain a greater information gain if the web page is divided by a horizontal line into two portions and informed whether the point is above or below the line. Given this information, the system may narrow down which DOM elements may possibly contain the point. The division, or line, which gives the system the most amount of information related to which DOM element contains the point, is the division that is selected because it has the highest information gain value as determined by the equations above.

In other implementations, entropy may be measured using simpler means than the calculation given above. For example, calculating the entropy of a region may include counting the number of elements included within a region. Suppose a web page contained four DOM elements: W, X, Y, and Z. A line L1 induced the page into a Half A and a Half B. W and X are contained entirely in Half A, Y has one half in Half A and the other in Half B, and Z is entirely in Half B. The entropy of Half A is 3, which is determined by counting the number of DOM that have at least some area within Half A, and the entropy of Half B is 2. The summed entropy of both sides is 5 (3+2=5).

A line L2 that induces the page into two different portions, where W and X are entirely within one portion, and Y and Z are entirely in the other portion may have a higher information gain based on this entropy calculation. Here the entropy of each side is 2, for a summed entropy value of 4 (2+2=4). The L2 may be selected as a division because it minimizes the summed entropy values, which produces a greater information gain. This calculation may be subject to a constraint that it generates divisions of a minimum size (otherwise, placing no cut may minimize the entropy value).

Figure 2:
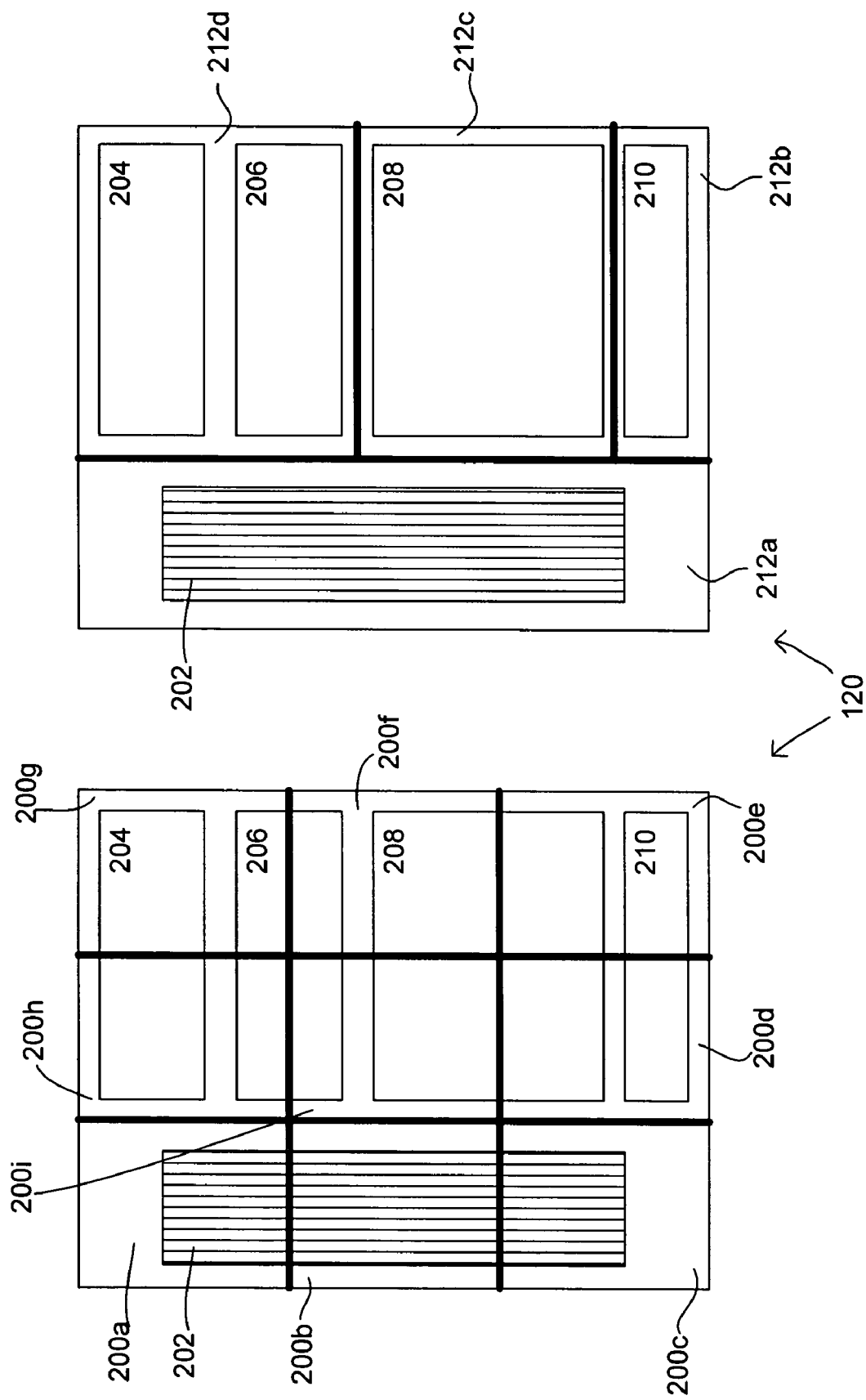
FIGS. 2A and 2B are schematic diagrams of two implementations for dividing the electronic document.

FIGS. 2A and 2B are schematic diagrams of two implementations for dividing the electronic document 102. FIG. 2A shows an implementation where the web page 120 is divided into nine portions 200A-I of a fixed size. The portion size is predetermined and the same for every document. When the document is segmented using this method, some elements that should remain whole are divided. For example, the web page 120 in FIGS. 2A and 2B includes a navigation pane 202, two paragraphs of related text 204 and 206, respectively, an image 208, and another block of text 210. In the implementation shown in FIG. 2A, the image 208 is divided into four pieces each of which is allocated to one of the portions 200D-F, or the portion 200I. Dividing the image this way makes the subject of the image difficult to interpret. In another example, the text block 206 is divided into four pieces distributed among the portions 200E-H, and 200I. The text is unreadable because the words that make up the sentences are distributed amongst several portions. When only one of the portions is displayed, a user may not view the entire sentence.

FIG. 2B shows an implementation where the web page 120 is divided based on the content of the web page. This division is based on an information gain calculation that determines which divisions produce the highest information gain concerning where discrete elements in the web page 120 are located. Here, the web page 120 is segmented into four portions 212A-D. Each portion contains one or more discreet elements. For example, the portion 212C includes the image 208. Including the entire image in the portion 212C permits the user to view that selected portion 212C without losing any part of the image. In another example, the paragraphs 204, 206 may be included in the same portion 212C because they contain related text. This grouping may be performed by an entropy calculation based on the proximity of the paragraphs to each other, and the word similarities within the paragraphs.

Figure 3:
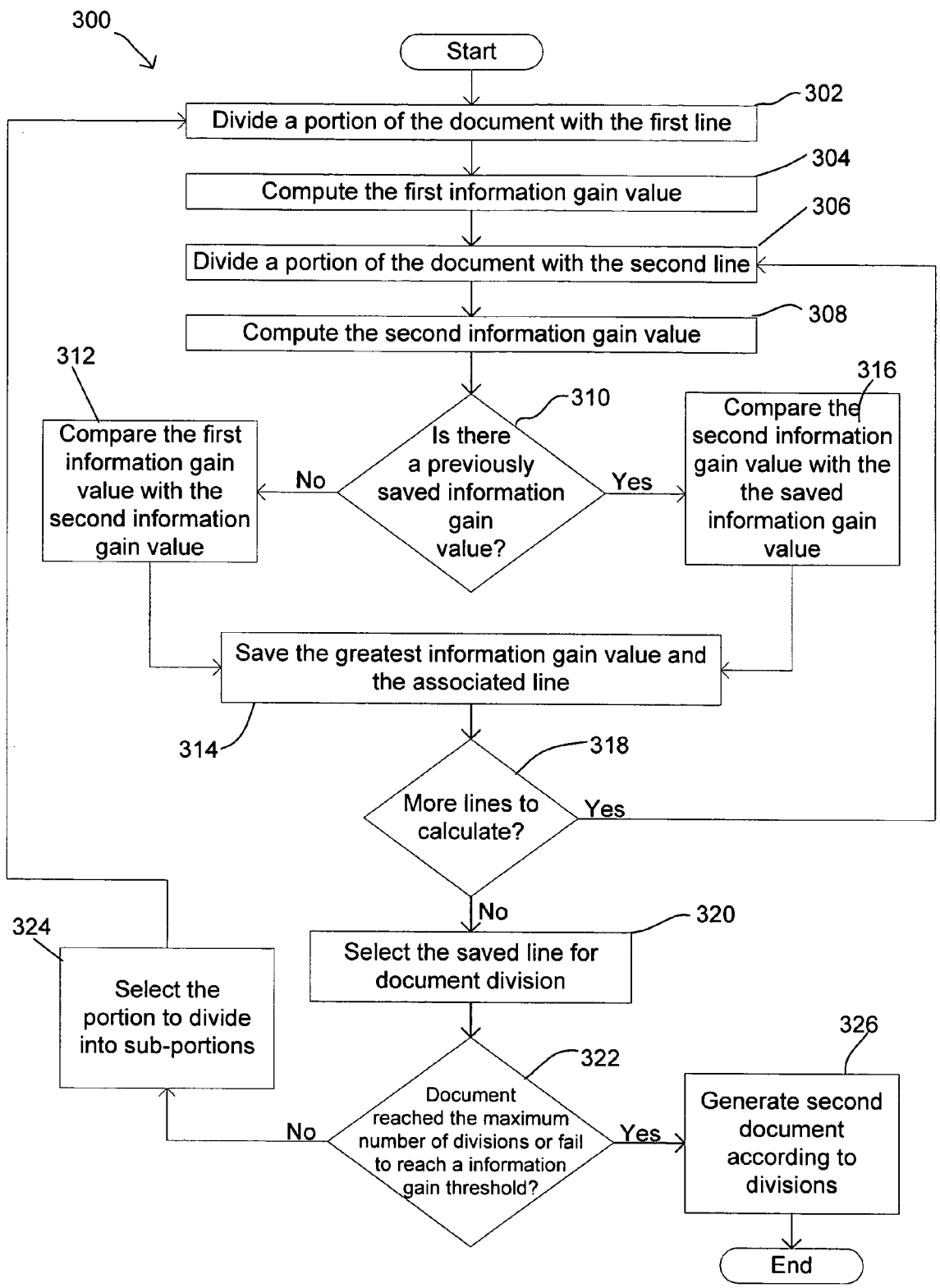
FIG. 3 is a flow diagram of a method for dividing the electronic document based on information gain values according to one implementation.

FIG. 3 is a flow diagram of a method for dividing the electronic document 102 based on information gain values according to one implementation. For example, the operations 300 can be performed in the server device 104. A processor executing instructions stored in a computer program product can perform the operations 300. The operations 300 may begin in step 302 with dividing a portion of the electronic document 102 with a first line. For example, the web page 102 may be divided by a vertical line on the far left side of the document. The vertical line may intersect the first pixels of every row from the top of the web page to the bottom.

In step 304, a first information gain value is computed. In one implementation, an information gain calculation module (shown in FIG. 4) may calculate an information gain value'based on a number and area of hypertext markup language (HTML) elements, such as text and web links. The information gain calculation module may use the information gain equation stated previously. For example, it may calculate a base entropy value for a web page before any divisions are calculated (i.e., Entropy (Y) in the above information gain equation). A line is selected that creates two portions. The entropy of each of the portions is calculated and multiplied by the area of the portions. The resulting portion values are summed together to generate the entropy of the line based on the split (i.e., Entropy (Y|Split) in the information gain equation) and subtracted from the base entropy value to produce the information gain associated with the selected line (i.e., InfoGain (Y|Split). In another implementation, the information gain calculation module may additionally calculate entropy values based on a variation in pixel intensity for the pixels that the first line intersects. These entropy values may be used as "tie-breakers" when several candidate lines produce the same (or close) informational gain. These implementations are discussed in greater detail in association with other figures.

In step 306, the web page is divided by a second vertical line on the left side of the document. The vertical line may intersect the second pixels of every row from the top of the web page to the bottom. In step 308, the second information gain value is computed. This computation may use a similar method to the one described in step 304.

In step 310, it is determined whether there is a previously saved information gain value. For example, the division module 108 accesses a storage system to determine whether an information gain value is stored. The information gain value may be a previously calculated information gain value from step 304 or step 308. If there is a previously saved information gain value, step 316 is performed. If there is not a previously saved information gain value, step 312 is performed.

In step 312, the first information gain value is compared with the second information gain value. For example, the line selector 404 compares the first information gain value computed in step 304 with the second information gain value computed in step 308. The selector 404 selects the information gain value that is the highest of the compared information gain values In one implementation, the line selector 404 may take into account the entropy associated with the pixel variation of the pixels intersected by the lines associated with the compared information gain values. For example, if the lines produce the same amount of information gain, the line selector may determine which line has the lowest pixel intensity entropy. The line selector may then select the information gain associated with the candidate line that has the lowest pixel entropy because greater pixel entropy may indicate that the associated line intersects an object, such as an image or text.

In step 314, the highest information gain value determined by comparisons performed in step 312 or step 316 is saved. The line, or an indicator that specifies the line, associated with the highest information gain value may also be saved. For example, if step 312 is performed, the first information gain value computed in step 304 may be greater than the second information gain value computed in step 308. The first information gain value and the associated line may be saved to the storage system or memory device. If step 316 is performed, a previously saved information gain value may be greater than the second information gain value calculated in step 308. The saved information gain value remains in the storage system or the memory device.

In step 316, the second information gain value is compared with the saved information gain value. This step is performed after steps 302-318 have been performed at least once, the performance of which results in an information gain value being saved. For example, if the division module 108 performs the steps 302-314, the first and second information gain values are compared and one of these values is stored in a memory device. This stored, or saved, information gain value is compared with another information gain value that is associated with another line that is selected by the division module 108. Using this iterative method, the division module may compare the information gain values associated with all the vertical lines in the web page 108, and save the highest information gain value.

In one example, the first information gain value may be a '5', the second entropy value may be a '6', and the third entropy value (i.e., the entropy value associated with a third line selected by the division module 108) may be a '2'. A comparison of the first information gain value and the second information gain value in step 312 results in the first information gain value '5' being saved in step 314. In step 316, the third information gain value '2' would be compared with the saved information gain value '5', which would result in the third information gain value '2' replacing the previously saved information gain value '5' in the memory device. In other implementations not shown in FIG. 3, more than one of the information gain values may be saved and the division module 108 may determine the highest information gain value by comparing the saved information gain values with each other.

In step 318, it is determined whether there are more lines to calculate. For example, the division module 108 may determine if there are any more vertical or horizontal lines present in the web page 102. If there are more lines, steps 306-314 may be performed again. Using this determination, the division module 108 may compare information gain values from possible vertical and horizontal lines present in the web page. If there are no more lines for which to calculate entropy values, step 320 is performed. For example, all possible vertical and horizontal lines in the web page 102 are selected and the associated information gain values are calculated for those lines.

In step 320, the saved line associated with the saved highest information gain value is selected as a dividing line, or a division, for the electronic document 102. For example, the line 118 shown in FIG. 1 has the highest information gain value of all the vertical and horizontal lines in the electronic document 102 after a first pass comparing the lines. The line 118 is selected as a division defining the right side of the portions 120A,C and the left side of the portions 120B,D, F.

In step 322, it is determined whether the document has reached the maximum number of divisions or if the information gain generated by a division fails to reach an information gain threshold. For example, the division module may divide the web page 102 into a predetermined number of portions, such as the six portions 120A-F shown in electronic document 120. If the line 118 has been selected for the document 120, only two portions are created—one portion to the right side of the line 118 and another portion to the left side of the line. If the maximum number of divisions indicates that six portions may created, steps 302-322 are performed again on each of the portions instead of the entire electronic document 102.

For example, the portion to the left side of the line 118 may be divided by horizontal lines. The division module selects the horizontal line with the highest information gain value. This new division defines the portions 120A and 120C, as shown in FIG. 1.

Alternatively, the maximum number of divisions may include how many lines are selected. For example, the division module 108 may be restricted from using more than four lines to divide the web page 120, as shown in FIG. 1. The use of four lines, however, may generate more than four portions, such as the portions 120A-F. In another implementation, the maximum number of divisions may be set for each axis. For example, a maximum number of vertical lines may be selected, and a maximum number of horizontal lines may be selected.

If the document has reached the maximum number divisions, step 326 is performed. In step 326, a second document is generated according to the divisions. For example, the document may be a subset of the portions 120A-F, such as the portion 120A. Alternatively, the document may include all of the portions 120A-F. The generated document may include a web page that displays all of the portions together with the selected lines that define each portion. The user may select one of the portions to access a separate web page or file that only displays an enlarged view of the selected portion. If the maximum number of lines is not reached, step 324 may be performed if the information gain value meets the information gain threshold value.

Also, if the selected line fails to generate an information gain value above the information gain threshold, step 326 may be performed. If the threshold is met, step 324 may performed if the maximum number of division is not reached. For example, the selected line may only generate a 10% information gain over the information gain value generated by the last line selected to create a division. In this case, the 10% information gain may not meet a 30% information gain threshold and consequently, the line selector 404 may not use the newly selected line to create a division.

In step 324, a portion created by the selected line is selected to iteratively perform the steps 302-322 upon. For example, if the selected line creates a portion A and a portion B, portion B may be selected to divide based on information gain. In some implementations, after portion B is selected, and the method returns to step 322, portion A is selected before a subdivision of portion B is selected.

Figure 4:
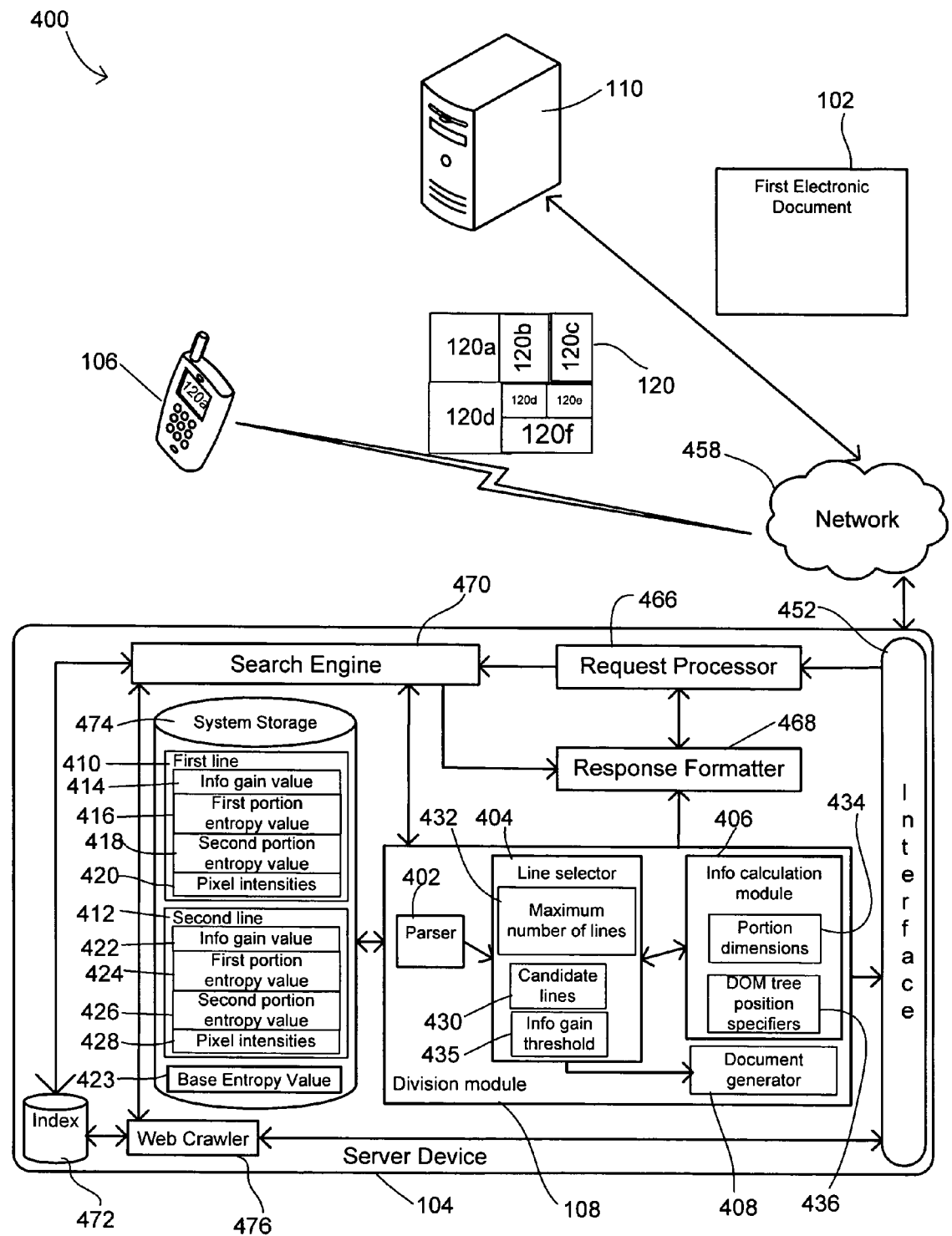
FIG. 4 is a schematic diagram of the system shown in FIG. 1 in more detail.

FIG. 4 is a schematic diagram of the system shown in FIG. 1 in more detail. FIG. 4 shows the server device 104 and devices in communication with it. The server device 104 may be implemented, for example, as part of an Internet search provider's general system.

The server device 104 is provided with an interface 452 to allow communications with a network 458, such as the Internet. The server device 104 may communicate with various devices, such as the electronic device 106 and the web server 110. The communication flow for any device may be bidirectional so that the server device 104 may receive information, such as commands, from the devices, and may also send information to the devices.

Commands and requests received from devices may be provided to a request processor 466, which may interpret a request, associate it with predefined acceptable requests, and pass it on, such as in the form of a command to another component of the server device 104 to perform a particular action. For example, in an implementation where the server device 100 24 is part of the Internet search provider's general system, the request may include a search request. The request processor 466 may cause a search engine 470 to generate search results corresponding to the search request. The search engine 470 may use data retrieval and search techniques like those used by the Google PageRank™ system. The results generated by the search engine 470 may then be provided back to the original requester using a response formatter 468, which carries out necessary formatting on the results.

The search engine 470 may rely on a number of other components for its proper operation. For example, the search engine 470 may refer to an index 472 of web sites instead of searching the web sites themselves each time a request is made, so as to make the searching much more efficient. The index 472 may be populated using information collected and formatted by a web crawler 476, which may continuously scan potential information sources for changing information.

The server device 104 may access a system storage 474. The system storage 474 may be one or more storage locations for files needed to operate the system, such as applications, maintenance routines, and management and reporting software. In some implementations, the server device 104 may store the generated document 120 in the system storage 474. The server device 104 may transmit the stored generated document 120 in response to future requests for the electronic document 102.

The server system 104 includes several components used to generate the second electronic document 120. The division module 108 includes a parser 402, a line selector 404, an information gain calculation module 406, and a document generator for 408. The system storage 474 includes information associated with a first line 410 and a second line 412. Additionally, the system storage may include information associated with other lines not shown.

Information associated with the first line 410 may include an information gain value 414 for that line. The information may also include a first portion entropy value 416 and a second portion entropy value 418, which is associated with the portions defined by the first line. For example, one portion entropy value may be the entropy of a first portion weighted by a coefficient representing the total area of the first portion as described in association with the equation for Entropy (Y|Split). The information may also include data on the pixel intensities 420 of pixels that the first line intersects. For example, the pixel intensities 420 may be the entropy of the pixels in the line, where the sample is based on the intensities of each pixel. Information associated with the second line 412 includes similar information.

The electronic device 106 sends a request through the network 458 for a first electronic document 102. The server device 104 receives the request and, in turn, requests the first electronic document 102 from the external web server 110. The first electronic document 102 is transmitted to the server device 104 and passed to the division module 108.

The division module receives the electronic document 102 and parses elements included in the document 102 using the parser 402. For example, the electronic document may be a web page which includes HTML (hypertext markup language) tags. The parser 402 may decode the entire electronic document 102 into its constituent elements. These elements may be DOM (Document Object Model) elements, or document objects.

The parser 402 may load the document objects from the initial document 102 into data structures in memory, such as a tree. Some document objects may be located within other objects. This placement of document objects specifies the structure of the DOM tree. For instance, the paragraph <p> element is included within the body <body> element. The parser 402 extracts the <p> element from the <body> element and creates a DOM tree where the <p> element is a child node of the <body> element. In other words, the <p> element is created as a child node in the tree because it is contained within the <body> element. The DOM tree allows the document objects to be accessed randomly, or in an order different from the order in which they are specified in the electronic document 102. FIG. 4 shows the parser 402 transmitting output, such as a DOM tree, to the line selector. The output may not be physically transferred to the line selector 404, but may instead be stored in memory which is then accessed by the line selector 404.

The line selector may select candidate lines 430 within the electronic document 102. Each candidate line has an information gain value 414, which may be saved in the system storage 474 after it is calculated by the information gain calculation module 406. The candidate lines may be every possible vertical or horizontal line (or lines on other axes) within a selected area. For example, a first set of candidate lines 430 may comprise all of the vertical lines possible in the document 102. Each line may be one pixel width wide and extend from the top of the document to the bottom. A second set of candidate lines may be all the horizontal lines possible the portion 120A. Additionally, the candidate lines may be curved and discontinuous.

The line selector 404 may also contain a maximum number of lines 432, which limits the line selector from selecting more lines than the prescribed maximum. In one implementation, the maximum number of lines 432 may specify the maximum number of horizontal and vertical lines the system should select to divide the electronic document into portions. In another implementation, the maximum number lines 432 may specify the maximum number of lines on a specified axis, such as the y-axis. Additionally, the line selector may contain a maximum number portions (not shown), which limits the line selector from selecting more lines if the portions defined by the new lines create more than the maximum number of portions.

Additionally, the line selector 404 may include the informational gain threshold described in association with step 322 of FIG. 3. In one implementation, the line selector 404 does not select additional lines to create new portions if the information gain threshold is not reached. This may occur even if the maximum number of lines 432 has not been reached. The information gain threshold may be based on the information gain generated by the division associated with the previously selected line. For instance, the threshold may be forty-five percent of the informational gain generated by the previously select line. If the new division created by the currently selected line does not produce an informational gain of at least forty-five percent of the information gain generated by the previous division, the line selector does not select any more lines.

The threshold may be applied to the division of a web page. For example, the web page may consist of text in several paragraphs. The division module 108 divides the paragraphs into separate portions with a horizontal line between each paragraph. The information gain threshold value prevents the division module from dividing the web page with vertical lines because the information gain produced by the vertical divisions does not meet the threshold value (i.e., diving the text vertically does not provide any new information because the content is text in paragraphs).

The information gain calculation module 406 includes portion dimensions 434 and DOM tree position specifiers 436. The information gain calculation module 406 calculates information gain values associated with each line, such as the information gain value 414, the first portion entropy value 416, and the second portion entropy value 418. For example, the line selector 404 may select a first line, which defines a first and second portion on either side of the line. The information gain calculation module 406 calculates entropy values 416, 418 for the first and second portions, weights them with coefficients representing the area, and sums them to calculate the entropy from the split. The calculation module 406 subtracts this sum from the base entropy value 423 to obtain the information gain value 414 associated with the first line.

The information gain calculation module may use the information gain equation described above to determine the entropy values, the coefficients, and finally the informational gain associated with each candidate line.

Weighting values may be used to weight the selection of a particular line over another. Weighting values may include the pixel intensities 420, the portion dimensions 434, and the DOM tree position specifiers 436. For example, the information gain calculation module may calculate an identical information gain for two candidate lines. The line selector may weight the lines that produce portions of certain dimensions so that they are selected. For example, lines which produce portions of the same or similar dimensions may be favored over lines that produce irregular and dissimilar portions. More particularly, lines may be favored that produce similarly sized rectangles.

In one implementation, portions may have a minimum height and width. The minimum height and width requirements may be stored as portion dimensions 434 shown in the information gain calculation module 406. The line selector 404 may favor the selection of lines that produce portions that meet the requirements by using coefficients that are combined with the information gain value. For example, a division that produces a portion three pixels wide may be disfavored by not adding any coefficients, whereas a division that produces a portion 30 pixels wide may be favored by adding a multiplying coefficient of three. Coefficients may be added to the information gain calculation so that entropy values are weighted to favor lines that produce portions associated with the portion dimensions 434.

In one implementation, the information gain calculation is used to find the line that maximizes the information gain as discussed above. The size of a DOM element affects the entropy values used in the information gain calculation because it represents the "p" variable given in the entropy calculation above. The selection of certain lines is weighted based on the size of DOM elements that are contained within a portion defined by the line. For example, a tiny horizontal DOM element may occur in the bottom one percent of the first electronic document 102. Selecting a horizontal line in this bottom one percent is advantageous in one way, but it is disadvantageous in another way. It is advantageous because the DOM element may be easily located if the system is informed that the DOM element is below this line. It is disadvantageous because the probability of the DOM element falling in the bottom one percent is small. This problem may be mitigated by weighting the entropy values with coefficients that account for the probability that a DOM will occur in a portion created by a candidate line. In other words, the multiplication of the "Total_Area(Region N) coefficient in the equation for Entropy (Y|Split) accounts for the probability that a DOM will occur in the region N.

The DOM area used in the "p" variable of the entropy equation may be measured by the total size of the DOM object. For example, the total size of the HTML <body> element is one hundred percent of a web page's area. Therefore, the probability that the <body> element will occur in any portion created by a candidate line is one hundred percent. The DOM size may also be measured by the portions of the DOM element that are not covered, or occluded by another DOM element, in other words, the DOM element's size is measured by the area not obscured by an element lower in the DOM tree.

The number of DOM objects in the portion also affects the entropy calculation that generates the entropy values used in the information gain calculation. As seen from the entropy calculation, the smaller the number of objects in the portion, the lower the entropy value.

The DOM tree position specifiers may describe an element's, such as an HTML tag's, position in a DOM tree. For example, the DOM tree may organize HTML elements so that the visually and logically "lower" elements are closer to the root of the tree and the "higher" elements are located farther from the root. For example, the HTML <body> tag may be the root tree because it is displayed under other elements and forms a context in which the other elements are displayed. In contrast, the bold tag, or <b> tag, which directs an Internet browser to bold text, is farther away from the root because several elements exist between the <body> tag and the <b> tag to give the <b> tag meaning. For example, a paragraph tag (<p> tag) may be a child of the <body> tag, and the <b> tag may be a child of the <p> tag. The <b> tag may then have a text child, such as "I'm emboldened" that is bolded when displayed.

The DOM tree position specifiers 436 may be used to weight certain line selections. In one implementation, if a DOM element has to be divided, it may be preferable to divide DOM elements closer to the root of the DOM tree. For example, because the <body> tag may occupy one hundred percent of the web page, the tag must be divided. Dividing a DOM element farther from the root, such as a <b> tag, however, is undesirable because dividing bolded text is disruptive.

For example, the line selector 404 may weight one line with an information gain value with a high coefficient if the average DOM element depth intersected by that line is near the root, and may wait another line with the same information gain value with a lower coefficient if the average DOM element intersected by this line is farther from the root.

Additionally, the information gain calculation module 406 may calculate the entropy values for the pixel intensities 420 of the pixels intersected by the first line. The information gain calculation module may measure the intensity of each pixel and then compare the variation between the pixels to determine a pixel intensity entropy value associated with the first line. This value may then be stored in the system storage 474.

After the information gain calculation module 406 determines the information gain values for each candidate line, the line selector 404 may select a line with the highest information gain value. The line selector 404 may save information defining the selected line, such as the pixel positions at the beginning and end of a vertical line, in the system storage 474. The process of calculating information gain associated with candidate lines and selecting the line that produces the highest information gain value may be repeated recursively for the portions defined by each selected line until the maximum number of lines 432 is reached or the divisions fail to produce an information gain above and information gain threshold. Information defining the selected lines may be sent to the document generator 408, which generates a second electronic document 120 including at least one of the portions defined by the selected lines.

The division module 108 transmits the second electronic document 120 to the network 458 using the interface 452. The electronic device, such as a cellular telephone 106, may receive the second electronic document using a wireless connection. The cellular telephone 106 may have an application, such as an Internet browser, that may display the second electronic document.

In one implementation, the electronic device 106 may be a personal computer. The information gain based division may be used to determine image tile, or portion, sizes when dynamically changing an image. For example, Google Maps is an application that displays a geographical image to a user. The information gain value generated by dividing an image of a lake is very low because the lake mostly consists of uniform pixel information, so the division module would leave the lake image as a large undivided tile. Alternatively, the information gain generated by dividing an image of New York City is much greater, so the division module would divide the image of the city into many separate tiles.

Figure 5A:
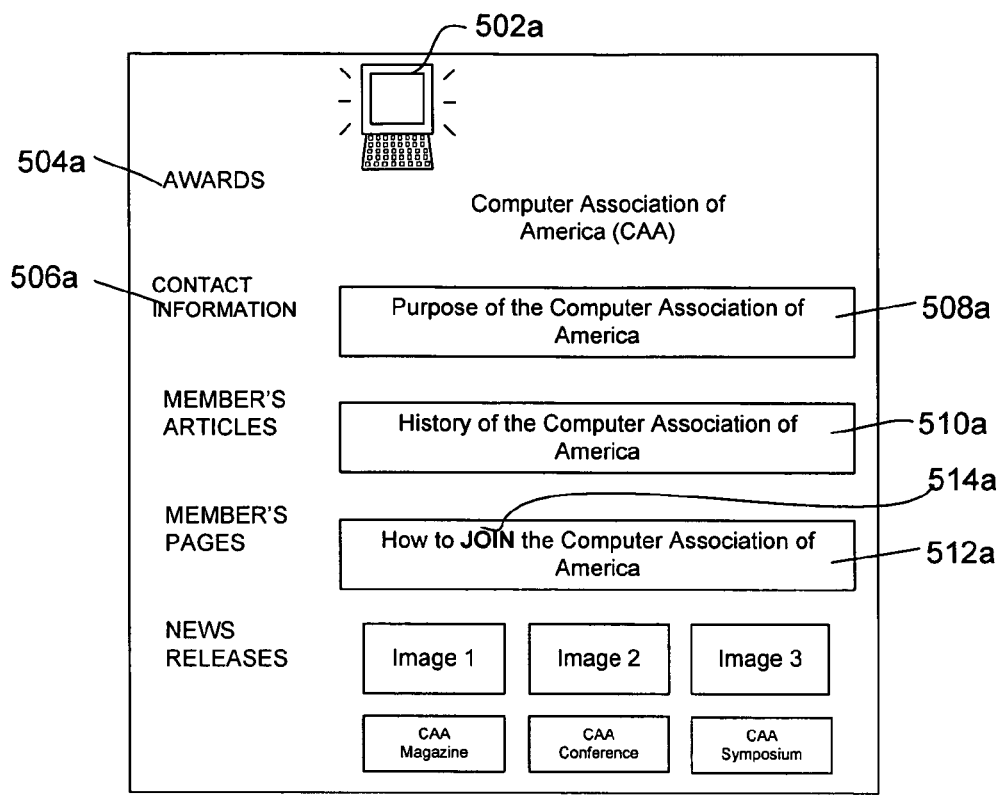
FIGS. 5A and 5B are exemplary schematic diagrams showing a web page and document objects included in that web page, respectively.
Figure 5B:
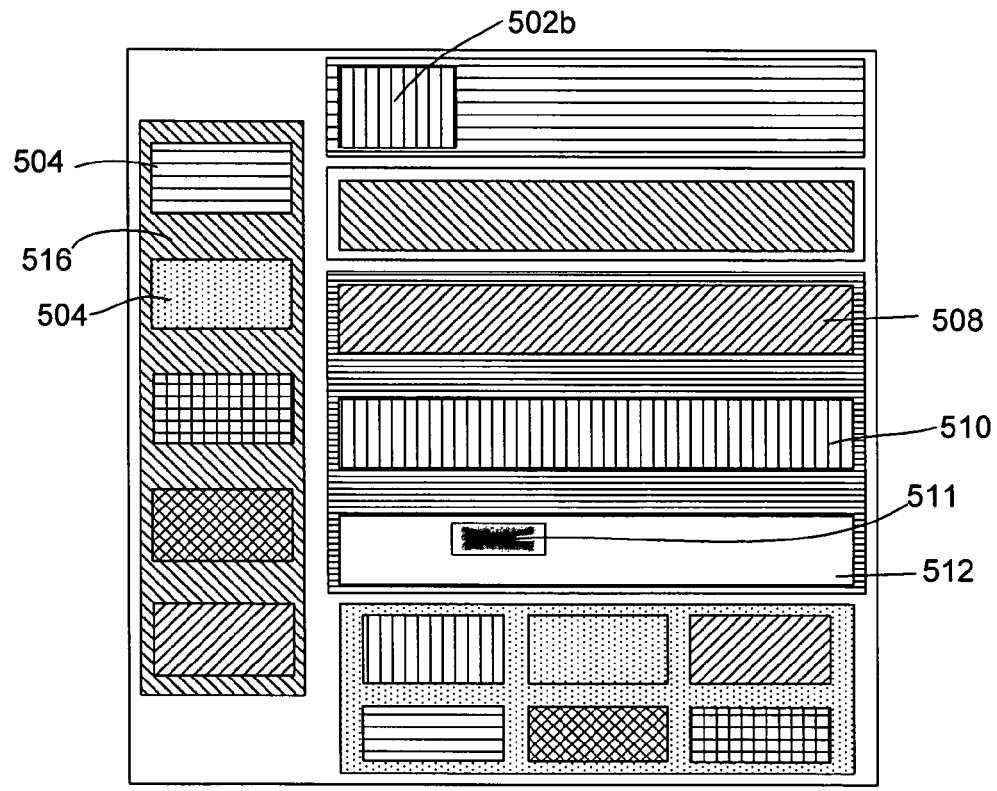

FIGS. 5A and 5B are exemplary schematic diagrams showing a web page 102 and the document objects included in that web page, respectively. The web page 102 in FIG. 5A is a web site for the Computer Association of America (CAA). The web page includes an image of a computer 502A and a navigation pane on the left side of the page which includes navigation links, such as an "AWARDS" link 504A and a "CONTACT INFORMATION" link 506A. Among other elements, the web page also includes three paragraphs of text 508A, 510A, and 512A. The third paragraph 512A and includes a bolded word "JOIN" 514A.

FIG. 5B is a visual representation of the size and location of the DOM elements in the web page 102. For example, a block 502B represents the computer image 502A. The navigation pane is a document frame. Although it is not visible in the web page is represented as a DOM object by the rectangular block 516. The block 516 includes the sub-blocks 504B, 506B that represent the "AWARDS" link 504A and the "CONTACT INFORMATION" link 506A, respectively. The three paragraphs of text 508A, 510A, and 512A are represented by three corresponding rectangular blocks 508B, 510B, and 512B. The bolded word "JOIN" 514A is a DOM bold object represented by the block 514B.

The graphical representation of the DOM elements is illustrative of how the division module 108 may determine the size, number, location, and depth of each element. The area represented by the DOM elements may be mapped to pixels corresponding to the position of the DOM elements. These factors may be used by the information gain calculation in determining information gain values for a given division created by a candidate line. For example, the information gain calculation module determines the depth of the DOM elements for each pixel intersected by the candidate line. The information gain calculation module may use the DOM memory tree structure determine the identity of particular elements present at each intersected pixel.

Figure 6A:
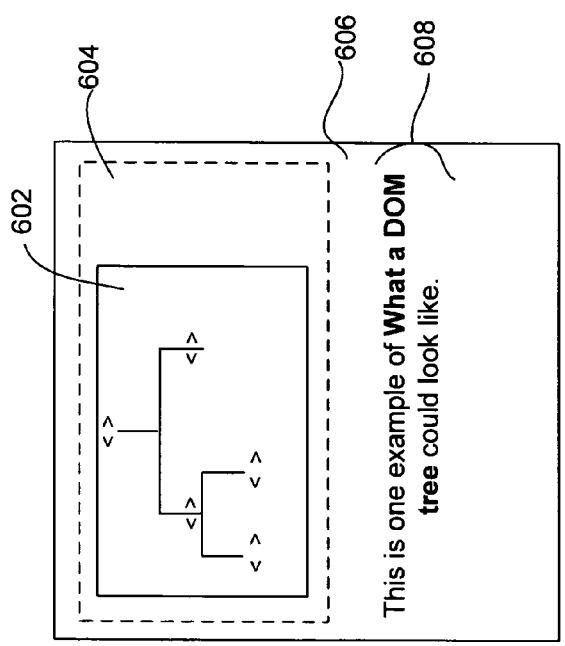
FIGS. 6A and 6B are exemplary schematic diagrams showing a web page and a document object model (DOM) tree representation of that web page, respectively.
Figure 6B:
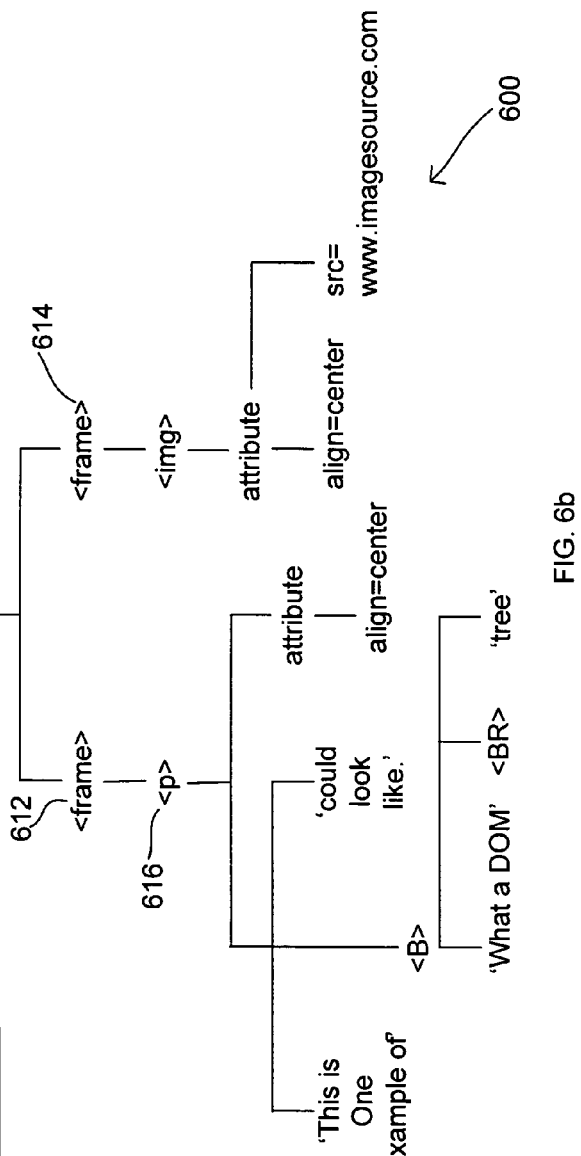

FIGS. 6A and 6B are exemplary schematic diagrams showing the web page 102 and a document object model (DOM) tree representation of that web page, respectively. FIG. 6A shows a web page with an image 602 of a DOM tree in an upper frame 604 of the web page 102. Text 606 which states "This is one example of what a DOM tree could look like" is in a lower frame 608 of the HTML document.

The parser 402 in the division module 108 may parse the web page shown in FIG. 6A into a DOM tree 600 graphically represented in the FIG. 6B. The tree 600 may consist of an <HTML> root node 610, two <frame> child nodes 612, 614 branching from the root node 610, and several child nodes branching from these nodes. Each node corresponds to an element in the web page 120 shown in FIG. 6A. The nodes near the root of the tree provide context for the lower nodes. For example, the <p> node 616 is contained within the <frame> node 612. This corresponds to the paragraph of text 608 in the lower frame 606.

The information gain calculation module 406 may use the DOM tree 600 to determine an information gain value for specific candidate line. For example, lines that divide elements that are nodes closer to the root of the tree 600 are less disruptive visually than lines that divide elements farther from the root.

FIGS. 7A-7C are schematic diagrams showing the division of the electronic document 102 based on the DOM elements according to one implementation. FIGS. 7A and 7B show two candidate lines 702 and 704, respectively. In FIG. 7A, the information gain calculation module 406 calculates portion entropy values associated with each line. For example, the first portion entropy value 416 is calculated for a first portion 706 on the left side of the candidate line 702, and the second portion entropy value 418 calculated for a second portion 708 on the right side of the line 702. Similarly, in FIG. 7B, the first portion entropy value 424 is calculated for a first portion 710 to the left of the candidate line 704, and the second portion entropy value 426 is calculated for the second portion 712 to the right of the line 704. The portion entropy values associated with line 702 are weighted by the portion areas, and summed together to produce the Entropy (Y|Split). This value is then subtracted from the entropy of the first portion to generate the information gain value 414. Similarly the entropy values for the portions associated with the line 704 are weighted, summed together, and subtracted from the entropy of the second portion to generate the information gain value 422.

The entropy values 414, 422 are compared and the line associated with the lowest information gain value may be selected. In this example, the line 702 produces a greater information gain value. Several factors contribute to the greater information gain value including the size, shape, and location of the DOM objects. For example, in FIG. 7A, the DOM object 714 is a long rectangular object along the leftmost side of the document. The line 702 divides the document so that the number of elements on the left side of the line is minimized to the object 714. The large size of the object 714 increases the probability that the line 702 is correctly placed because the portion 706 contains only that object. In other words, the information gain value for the line that creates the portion 706 is high because the created portion entirely contains the object 714, which occupies most of the space, and no other objects are present in the portion 706. Additionally, the line 702 creates the portion 708 which entirely contains the document objects 716, 718, 720, and 722.

The line 702 is favored by the information gain calculation because other lines could not isolate a single document object while leaving other document objects undivided. For example, the line 704 is associated with a lower information gain value 422 because it creates portions that divide DOM elements 716, 718, 720, and 722. The information gain calculation module 406 may disfavor the division of DOM elements, using the document tree position specifiers 436.

After the line selector has selected the line 702, the line selector may select candidate lines, such as the line 724, from the second portion 708. The line 724 may create another set of first and second portions 726, 728. The process described in association with FIGS. 7A and 7B may be repeated recursively on each portion until a maximum number of portions is reached.

Figure 8:
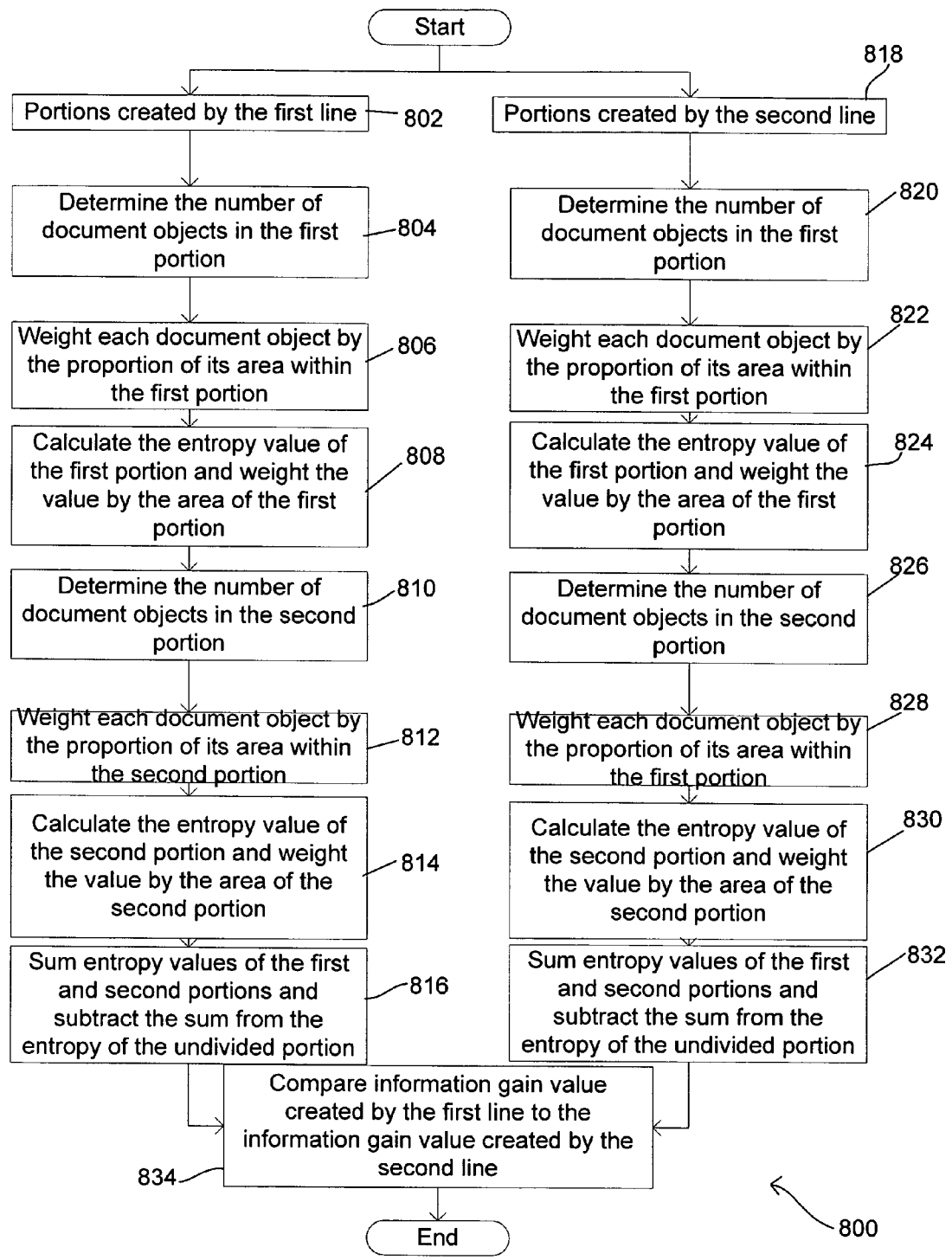
FIG. 8 is a flow diagram of a method for dividing the electronic document based on the DOM elements according to one implementation.

FIG. 8 is a flow diagram of a method for dividing the electronic document 102 based on the DOM elements according to one implementation. For example, the operations 800 can be performed in the server device 104. The operations 800 may begin in step 802 where a first and second portion are created by the first line. In step 804, the number of document objects in the first portion may be determined. For example, the parser 402 may create the DOM tree 600 and determine attributes of the document objects in the first portion, such as the portion 706 of FIG. 7A.

In step 806, each document object may be weighted by the proportion of its area within the first portion. For example, coefficients may be used in the entropy calculation Entropy (Y|Split) to account for the size of a DOM object within a created portion over the size of the DOM object regardless whether the area is within the created portion.

In step 808, an entropy value for the first portion may be calculated and the value may be weighted by the area of the first portion. For example, the information gain calculation module 406 may determine the first portion entropy value 416 by determining the number, size, and location of DOM objects in the first portion. This entropy value and then be multiplied by the area of the first portion. Steps 810-814 are similar to steps 804-808, except they are performed for the second portion created by the first line.

In step 816, the weighted first and second portion entropy values are summed, and this sum is subtracted from the entropy of the undivided document. For example, the first portion entropy value 416 and the second portion entropy value 418, which are weighted by their respective areas, are summed and the sum is subtracted from the base entropy value 423, which represents the entropy of the portion before it was divided by the first and second lines. The resulting value is the information gain value 414. Steps 818-832 are similar to steps 802-816, except they are performed for the portions created the second line, by such as line 704. The two branches of the flow diagram may be performed independently, in parallel, or successively.

In step 834, the information gain values associated with the first and second lines are compared to determine which is greater. For example, the information gain calculation module 406 may compare the information gain value 414, which is associated with the first line 702, with the information gain value 422, which is associated with the second line 704, to determine which is greater. The line selector 404 may select the line associated with the greater information gain value and save information specifying the line in system storage 474 for future use by the document generator 408.

Figure 9A:
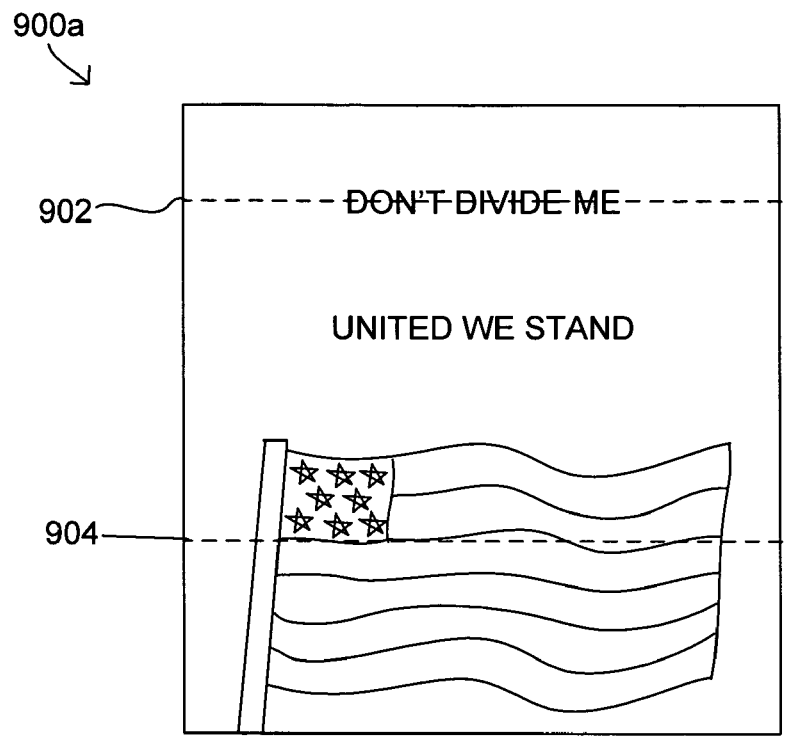
FIGS. 9A and 9B are schematic diagrams showing divisions in a web page based on pixel intensity according to one implementation.
Figure 9B:
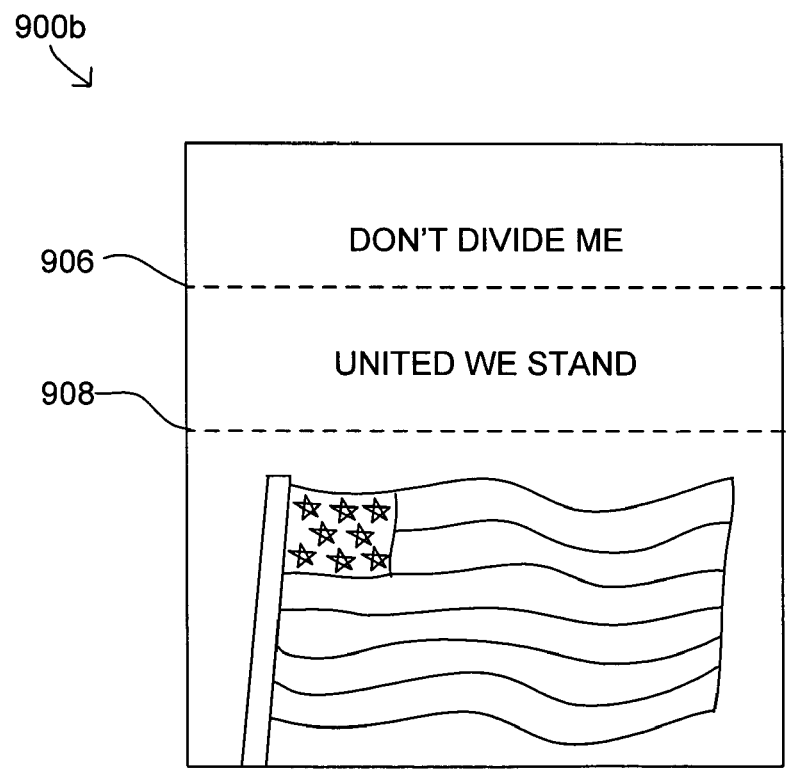

FIGS. 9A and 9B are schematic diagrams showing divisions in a web page based on pixel intensity according to one implementation. In one implementation, the web page may be divided using computer vision. In FIG. 9A, the horizontal line 902 passes through the text "Don't divide me." The information gain calculation module 406 may calculate the pixel intensity 420 for every pixel that the line intersects. For example, the calculation module 406 may calculate a high intensity value for a black pixel that is part of the letter "D" in the word "Don't." The module 406 may then calculate a low intensity value for a white pixel that is part of the white space on the inside of the letter "D." The information gain calculation module 406 may then determine variation between the pixel intensities. Here, a line that intersects pixels with a wide variation indicates that the line is passing through text. Similarly, the information gain calculation module 406 may calculate pixel intensities for pixels that are intersected by a line 904. The line 904 passes through an image of the flag, so the variation in pixel intensities indicates that the line intersects an image with different colors.

In contrast, lines 906 and 908 shown in FIG. 9B pass through a space of white or another uniform color. Because the pixels' colors are the same, the pixels' intensities are the same. The information gain calculation module 406 determines that the pixel variation between the pixels intersected by the lines 906, 908 is zero. This indicates that the line is not intersecting text, images, or other DOM objects.

In some implementations, division using computer vision is combined with division based on DOM elements. The information gain calculation module 406 may use computer vision to calculate the entropy of the pixel intensities. For example, the line selector 404 may select five candidate lines with the information gain values. The information gain calculation module 406 may calculate the pixel intensities for the pixels that each of the candidate lines intersect, and the line selector 404 may select a line from the candidate lines that has the lowest entropy value based on variation between the pixel intensities.

In another example, the line selector 404 may select a line with the highest information gain value and the information gain calculation module 406 may calculate pixel intensities for the selected line and for lines near the selected line. Out of the selected and nearby lines, the one with the least variation between the pixel intensities may be selected as a finally selected line. For example, the line selector 404 may select the line 902 shown in FIG. 9A. The information gain calculation module 406 may calculate an entropy value based on the variation between the pixel intensities for two horizontal lines above and two horizontal lines below the line 902. The number of lines to examine near the line 902 may be stored in the system storage 474. After the entropy of the pixel intensities are calculated, the line selector 404 may determine that the second horizontal line below the line 902 has a lower pixel intensity entropy than the line 902. The selector 404 may then select the line with the lower variation and avoid selecting the line 902 which intersects text.

Figure 10:
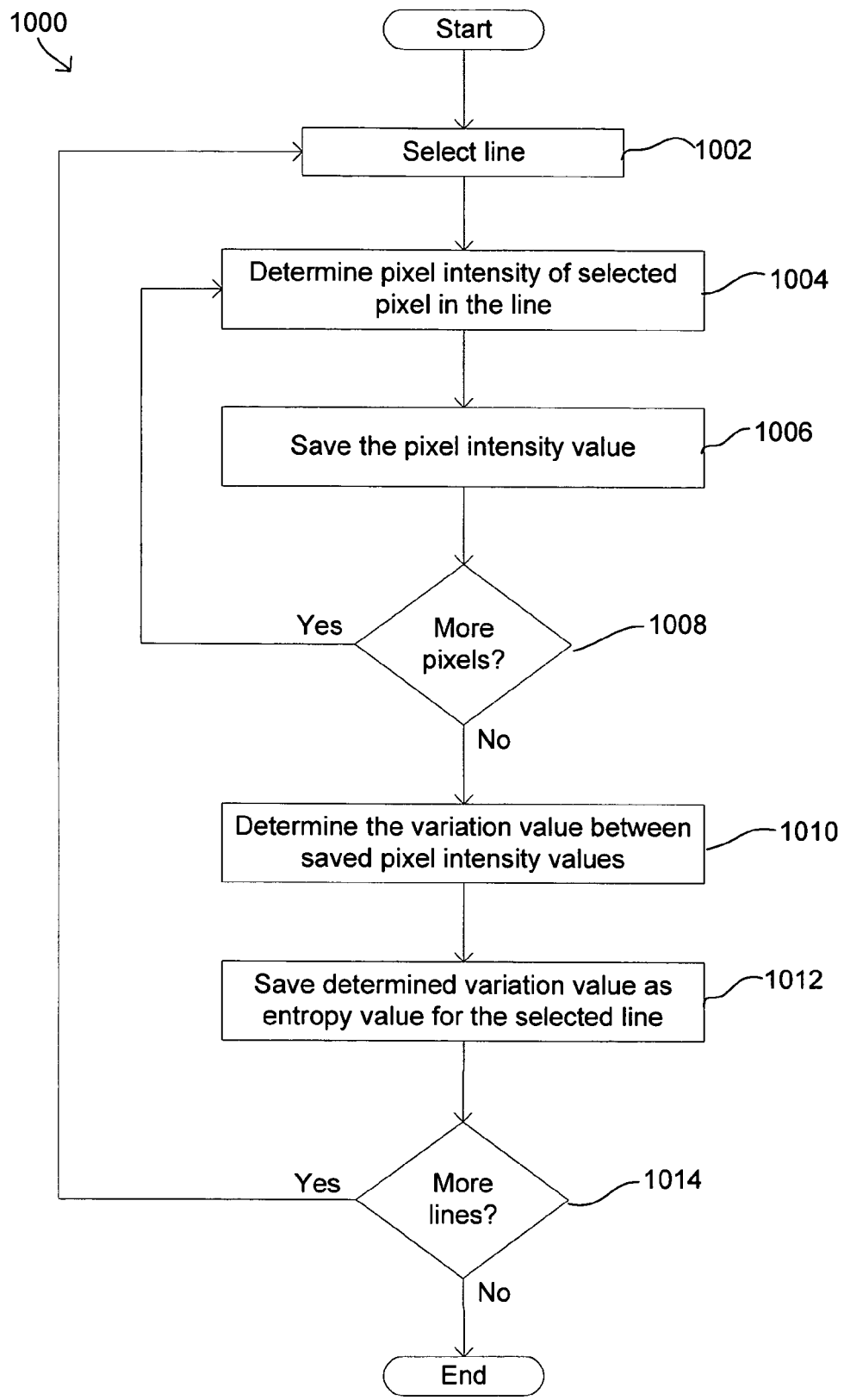
FIG. 10 is a flow diagram of a method for dividing the web page shown in FIG. 9 using pixel intensity.

FIG. 10 is a flow diagram of a method for dividing the web page shown in FIG. 9 using entropy based on pixel intensity. For example, the operations 1000 can be performed in the server device 104. The operations 1000 may begin in step 1002 with selecting a line. For example, the line selector 404 may select the line 902 shown in FIG. 9A.

In step 1004, the pixel intensity of selected pixels in the line may be determined. For example, the information gain calculation module 406 may determine the pixel intensity for a single pixel that is intersected by the line 902. In step 1006, the pixel intensity may be saved in the system storage 474.

In step 1008, it is determined whether there any more pixels. For example, the information gain calculation module 406 determines if there are any more pixels left in the line 902 that need pixel intensity calculations. In one implementation, the module 406 may select pixels in a sequential order until all the pixels within a line have been selected. In another implementation, the module 406 may only determine a subset of pixel intensities. For example, the first 20 intensities for pixels in the line 920 may be determined. The calculation module 406 may perform a preliminary variation calculation. If the pixel intensity variation is above a certain threshold (e.g., indicating the line intersects text), the rest of the pixel intensities are not calculated, and another line is selected.

If more pixels are available, steps starting with step 1004 are performed. If no more pixels are available, step 1010 is performed. In step 1010, a variation value between saved pixel intensity values is determined. For example, a saved pixel intensity from a first pixel is compared with a saved pixel intensity from a second pixel. The difference between the intensities is used to determine the variation value. In some implementations, all of the saved pixel values are compared with each other and the amount of variation between each of the pixels is used determine the variation value.

In step 1012, the determined variation value is saved as the entropy value for the selected line. For example, the entropy value 414 is the pixel intensity variation value for a first line. The information gain calculation module 406 may save the entropy value 414 in the system storage 474.

In step 1014, it may be determined whether there are more lines to select. If there are more lines to select, steps 1002-1014 are performed again. If there are no more lines to select, the operations 1000 end. For example, the line selector 404 selects the line 902 in the step 1002. An indicator specifying that this line has been selected may be recorded in the system storage. The indicator may include a counter, which is set with the number of possible lines in the portion to be examined. As each line is selected, the counter is decremented. After the counter reaches a predetermined number, such as zero, no more lines may be selected. Alternatively, the line selector 404 may continue to select lines above (or below) the previously selected lines until a line is reached that does not have pixel values.

Figure 11:
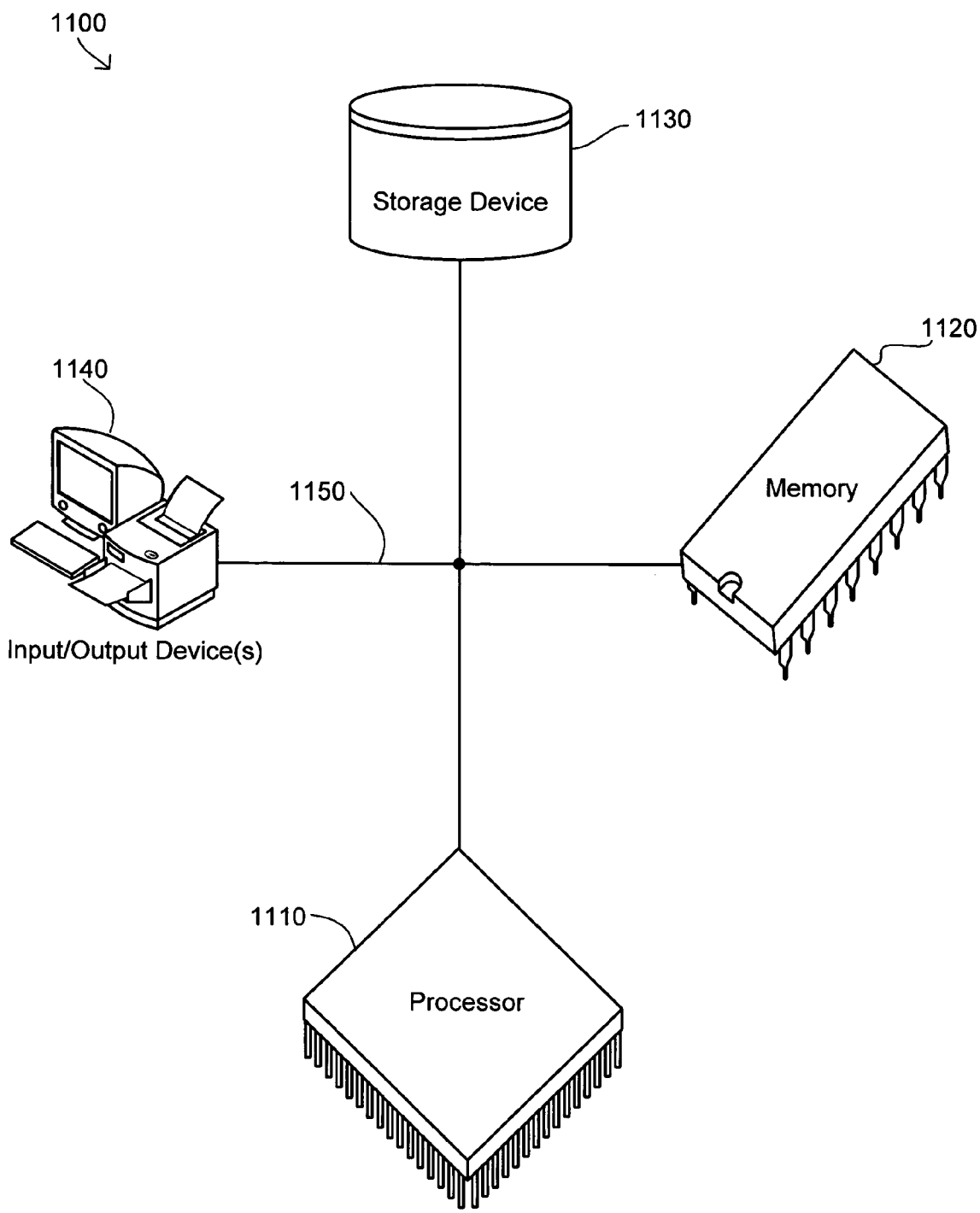
FIG. 11 is a schematic diagram of a general computing system.

FIG. 11 is a schematic diagram of a generic computer system 1100. The system 1100 can be used in the operations 300, 800, and 1000 described above, according to one implementation. For example, the system 1100 may be included in either or all of the server device 104, the electronic device 106, and the web server 110.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 700. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Portions of this disclosure discuss the electronic documents including HTML documents, but any number of formats may be processed by the described system including XML (Extensible Markup Language), WML (Wireless Markup Language), PDF (Portable Document Format), word processing formats, e-mail formats, and image formats. Also, the logic flows depicted in the figures do not require the particular order shown, or sequential order, to achieve desirable results. Also, other steps may be provided, or steps may be eliminated, from the described flows, and other components may be added to, or removed from, the described systems. Accordingly, other implementations are within the scope of the following claims.

What is claimed is:

1. A method for formatting an electronic document for display on an electronic device, comprising:
   receiving a first electronic document;
   determining a first information gain value associated with a first line that divides the first electronic document into a first portion and second portion, including by determining a difference between an entropy value associated with the first line and an entropy value associated with the first electronic document;
   determining a second information gain value associated with a second line that divides the first electronic document into a third portion and fourth portion, including by determining a difference between an entropy value associated with the second line and the entropy value associated with the first electronic document, wherein each of the entropy value associated with the first line, the entropy value associated with the second line, and the entropy value associated with the first electronic document is determined based at least in part on document objects in the portions created by the first Zinc, the second line, and the first electronic document, respectively;
   determining which of the first information gain value and second information gain value is greater;
   in response to determining that the first information gain value is greater, using the first information gain value to recursively divide the portions defined by the first line and defining a second electronic document that includes at least a portion defined by the first line;

in response to determining that the second information gain value is greater, using the second information gain value to recursively divide the portions defined by the second line and defining a third electronic document that includes at least a portion defined by the second line;

defining a document object model tree based at least in part on parsing the document objects;

calculating a depth of a document object for particular pixels intersected by each of the first line and the second line; and wherein each of the first information gain value and the second information gain value is calculated as a difference between an information value of the first document before the first document is divided, and an information value for each portion of the first document after the first document is divided, and wherein each of the first information gain value and the second information gain value is determined as a function of an amount of document objects in a specified portion of the first document.

2. The method of claim 1, wherein the entropy calculation further comprises determining an area of the document objects within the portions.

3. The method of claim 1, wherein the document objects are specified by hypertext markup language elements.

4. The method of claim 1, wherein the information gain values are weighted by an entropy value based on the variation between intensities of pixels that the first line intersects to obtain the entropy value to weight the information gain value associated with first line, and an entropy value based on the variation between intensities of pixels that the second line intersects to obtain the entropy value to weight the information gain value associated with second line.

5. The method of claim 1, further comprising stopping the recursive division when a maximum number of lines are selected.

6. The method of claim 1, further comprising stopping the recursive division when an information gain threshold is not met.

7. The method of claim 1, wherein the information gain value calculation further comprises coefficients weighted to favor the divisions that produce similarly sized rectangles.

8. The method of claim 1, wherein the amount of document objects in the specified portion of the first document is computed according to an area of the document objects in the specified portion of the first document.

9. The method of claim 1, wherein the amount of document objects in the specified portion of the first document is computed as a total number of the separate document objects that are located in the specified portion of the first document.

10. The method of claim 1, further comprising formatting the document for review by a user so that particular user actions are mapped to cause selection of particular ones of multiple specified portions of the first document.

11. The method of claim 1, further comprising comparing information gain values generated by dividing the document with multiple lines, and reformatting the document so that a split is made along a first line that creates a divided document that generates an information gain value that is determined to be higher than an information gain value for divided documents created by other lines of the multiple lines.

\* \* \* \* \*

UNITED STATES PATENT AND TRADEMARK OFFICE
CERTIFICATE OF CORRECTION

| | | |
|---|---|---|
| PATENT NO. | : 8,176,414 B1 | Page 1 of 1 |
| APPLICATION NO. | : 11/241224 | |
| DATED | : May 8, 2012 | |
| INVENTOR(S) | : Shumeet Baluja | |

It is certified that error appears in the above-identified patent and that said Letters Patent is hereby corrected as shown below:

In the Claims:

Column 20, line 58, in Claim 1, delete "Zinc," and insert -- line, --, therefor.

Signed and Sealed this
Twenty-fourth Day of July, 2012

David J. Kappos
*Director of the United States Patent and Trademark Office*